US008832155B2

(12) United States Patent
Bruno

(10) Patent No.: US 8,832,155 B2
(45) Date of Patent: Sep. 9, 2014

(54) MINIMIZING DATABASE REPROS USING LANGUAGE GRAMMARS

(75) Inventor: Nicolas Bruno, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 12/814,504

(22) Filed: Jun. 14, 2010

(65) Prior Publication Data

US 2011/0307740 A1 Dec. 15, 2011

(51) Int. Cl.
*G06F 17/30* (2006.01)
*G06F 7/00* (2006.01)
*G06F 11/36* (2006.01)

(52) U.S. Cl.
CPC ........ *G06F 11/3684* (2013.01); *G06F 11/3696* (2013.01)
USPC ...................................................... 707/797

(58) Field of Classification Search
USPC ...................................................... 707/797
See application file for complete search history.

(56) References Cited

U.S. PATENT DOCUMENTS

| 6,138,112 | A | * | 10/2000 | Slutz | ............................. | 707/748 |
|---|---|---|---|---|---|---|
| 6,324,683 | B1 | | 11/2001 | Fuh et al. | | |
| 7,117,483 | B2 | | 10/2006 | Dorr et al. | | |
| 7,539,977 | B1 | | 5/2009 | Bloom | | |

OTHER PUBLICATIONS

Bruno et al, Finding Min-Repros in Database Software, 2009, pp. 1-6.*
Bruno et al, Mini-Me: A Min-Repro System for Database, 2009, pp. 1-4.*
Christer Samuelsson, Grammar Specialization Through Entropy Thresholds, 2002, pp. 188-195.*
Zeller, Andreas., "Automated Debugging: Are We Close?", Retrieved at << http://ieeexplore.ieee.org/ielx5/2/20799/00963440. pdf?arnumber=963440 >>, Computer, vol. 34, No. 11, Nov. 2001, pp. 6.
Whalley, David B., "Automatic Isolation of Compiler Errors", Retrieved at << http://www.cs.fsu.edu/~whalley/papers/ acmtoplas94.ps >>, ACM Transactions on Programming Languages and Systems (TOPLAS), vol. 16, No. 5, Sep. 1994, pp. 1-14.
Cleve, et al., "Finding Failure Causes through Automated Testing", Retrieved at << http://www.infosun.fim.uni-passau.de/st/papers/ aadebug2000/aashort.pdf >>, Proceedings Fourth International Workshop on Automated Debugging, Aug. 28-30, 2000, pp. 6.

(Continued)

*Primary Examiner* — Kuen Lu
(74) *Attorney, Agent, or Firm* — Sandy Swain; Brian Haslam; Micky Minhas

(57) ABSTRACT

Described is automatically processing an initial database repro (text representing a bug when corresponding script is executed in a database engine) into a min-repro (a subset of the text) that is simplified version of the initial repro yet still contains the bug. A parse tree representative of the initial database repro is processed into simplified parse trees based on language grammar rules, e.g., by replacing higher level nodes with descendant nodes. Repros of the simplified parse trees are executed to determine which simplified repros still fail execution because of the bug (that is, the simplified repros were not oversimplified). A minimum simplified parse tree with respect to a desired level of minimality is found from among those failing repros, with the simplified repro that corresponds to the minimum simplified parse tree output as the min-repro.

20 Claims, 5 Drawing Sheets

(56) References Cited

OTHER PUBLICATIONS

Burger, Martin., "Locating Failure-Inducing Code Changes in an Industrial Environment", Retrieved at << http://www.st.cs.uni-saarland.de/publications/files/burger-thesis-2005.pdf >>, Dec. 14, 2005, pp. 118.

Zhang, et al., "Dynamic Slicing Long Running Programs through Execution Fast Forwarding", Retrieved at << http://www.cs.purdue.edu/homes/xyzhang/Comp/fse06.pdf >>, Foundations of Software Engineering, Proceedings of the 14th ACM SIGSOFT international symposium on Foundations of software engineering, Nov. 5-11, 2006, pp. 11.

Zeller, Andreas., "Isolating Cause Effect Chains from Computer Programs", Retrieved at << http://www.st.cs.uni-saarland.de/papers/fse2002/p201-zeller.pdf >>, Foundations of Software Engineering, Proceedings of the 10th ACM SIGSOFT symposium on Foundations of software engineering, Nov. 18-22, 2002, pp. 10.

Börzsönyi, et al., "The skyline operator", Retrieved at << http://www.dbis.ethz.ch/research/publications/38.pdf >>, Proceedings of the 17th International Conference on Data Engineering, Apr. 2-6, 2001, pp. 20.

Bruno, et al., "Holistic twig joins:optimal XML pattern matching", Retrieved at << http://www2.research.att.com/~divesh/papers/bks2002-twigjoin.pdf >>, International Conference on Management of Data, Proceedings of the 2002 ACM SIGMOD international conference on Management of data, Jun. 4-6, 2002, pp. 12.

Bruno, et al., "Configuration-parametric query optimization for physical design tuning", Retrieved at << http://citeseerx.ist.psu.edu/viewdoc/download?doi=10.1.1.114.2390&rep=rep1&type=pdf >>, Proceedings of the 2008 ACM SIGMOD international conference on Management of data, Jun. 9-12, 2008, pp. 12.

Bruno, et al., "Finding min-repros in database software", Retrieved at << http://research.microsoft.com/pubs/115252/dbTest09MinRepro.pdf >>, International Conference on Management of Data, Proceedings of the Second International Workshop on Testing Database Systems, Jun. 29, 2009, pp. 1-6..

Graefe, Goetz., "The Cascades framework for query optimization", Retrieved at << http://citeseerx.ist.psu.edu/viewdoc/download?doi=10.1.1.98.9460&rep=rep1&type=pdf >>, Data Engineering Bulletin, 1995, pp. 19-28.

"Microsoft. Analysis services overview (white paper), 2007", Retrieved at << http://download.microsoft.com/download/a/c/d/acd8e043-d69b-4f09-bc9e-4168b65aaa71/SSAS2008Overview.docx >>, White Paper, Dec. 2007, pp. 12.

"Microsoft. MDX language reference (MDX), 2009", Retrieved at << http://msdn.microsoft.com/en-us/library/ms145595.aspx >>, Retrieved Date: Feb. 18, 2010, p. 1.

Misherghi, et al., "HDD: hierarchical delta debugging", Retrieved at << http://www.eecs.northwestern.edu/~robby/courses/395-495-2009-fall/hdd.pdf >>, International Conference on Software Engineering, Proceedings of the 28th international conference on Software engineering, May 20-28, 2006, pp. 10.

Slutz, Don., "Massive stochastic testing of SQL", Retrieved at << http://www.cse.iitb.ac.in/dbms/Data/Courses/CS632/Papers/vldb98-RAGS.pdf >>, Very Large Data Bases, Proceedings of the 24rd International Conference on Very Large Data Bases, Aug. 24-27, 1998, pp. 618-622.

Zeller, Andreas., "Yesterday, my program worked. Today, it does not.Why?", Retrieved at << http://www.st.cs.uni-saarland.de/publications/files/zeller-esec-1999.pdf >>, ACM SIGSOFT Software Engineering Notes, vol. 24, No. 6, Nov. 1999, pp. 15.

Zeller, et al., "Simplifying and isolating failure-inducing input", Retrieved at << http://citeseerx.ist.psu.edu/viewdoc/download?doi=10.1.1.14.2803&rep=rep1&type=pdf >>, IEEE Transactions on Software Engineering, vol. 28, No. 2, Feb. 2002, pp. 1-17.

* cited by examiner

MINIMIZING DATABASE REPROS USING LANGUAGE GRAMMARS

BACKGROUND

Database engines and database-centric applications have become very complex software systems. As a result, significant amounts of testing and debugging are needed to implement a database service.

One aspect of testing is to uncover the presence of a "bug" (or undesirable system behavior); debugging is used to identify the root cause of the problem so as to determine ways to fix the bug. When possible, each bug is associated with a precise set of steps, referred to as a "repro," which deterministically reproduces the error.

The starting point for the debugging process is often a large repro that includes a number of aspects that are irrelevant to reproducing the bug. This is generally a consequence of automatic randomized test generators, or real-world application scenarios. The length and complexity of repros prevents developers from reacting quickly to new bugs, because usually a long manual "repro-minimization" phase needs to occur before the actual debugging procedure takes place.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an initial database repro (text) is processed into a min-repro (a subset of the text), including by simplifying a parse tree representative of the initial database repro into simplified parse trees based on language grammar rules. The simplified parse trees (i.e., simplified repros corresponding to those parse trees) are executed to determine which simplified repros fail execution because of a bug corresponding to the initial database repro; (that is, the simplified repros still contain the bug after simplification and thus were not oversimplified). A minimum simplified parse tree (with respect to a desired level of minimality) is determined from among those simplified parse trees that correspond to the failed repros, with the min-repro based upon that minimum simplified parse tree output as the min-repro.

In one aspect, a parse tree that represents an initial database repro is input as a current parse tree. Simplified parse trees are obtained by replacing nodes in the current parse tree with descendant nodes based on language grammar rules. Each simplification has a corresponding simplified repro executed to determining whether the execution fails (e.g., because of a bug corresponding to the initial repro). If not, another unexecuted simplification is chosen, and so on. If there is a failure, and the simplified parse tree is simpler than a current minimum simplified parse tree, then the simplified parse tree becomes the current minimum simplified parse tree, with further simplification attempted on that current minimum simplified parse tree via recursion, up to a desired level of minimality. When processing completes, the min-repro is determined from the current minimum simplified parse tree.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an automated technique to minimize database repros, based upon underlying language grammars, (where as used herein, a "repro" is a script in a database language). More particularly, the technique uses language grammars to automatically find min-repros (e.g., the simplest version of a repro that still makes the original problem manifest). By considering syntactically valid repros, a large number of irrelevant repros may be eliminated; (some of these are repros that prior approaches need to consider). As will be understood, the technique is focused, and helps to isolate bugs and simplify debugging during development stages by consistently providing repros that are as concise as and/or simpler than manually constructed repros, yet are obtained significantly faster.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and database technology in general.

Figure 1:
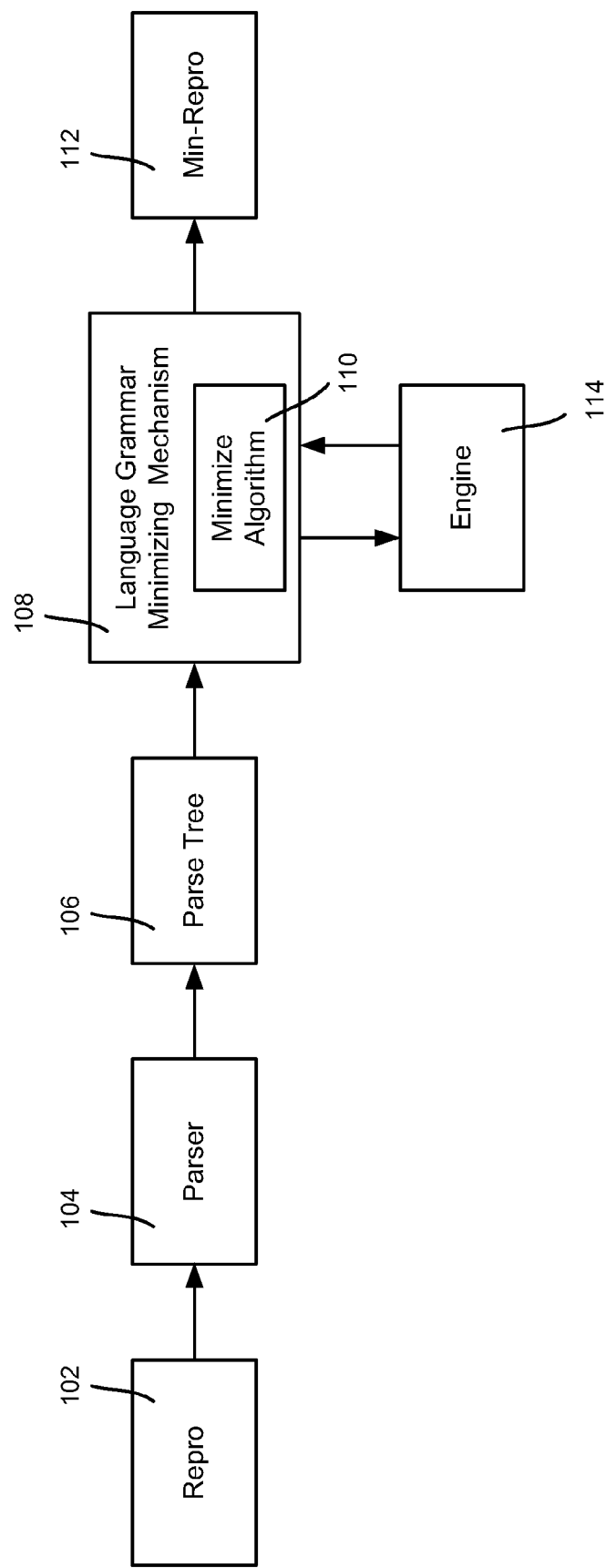
FIG. 1 is a block diagram representing example components for determining a min-repro from an initial database repro.

FIG. 1 is a block diagramming showing general aspects of the process for minimizing a repro. Note that as used herein, "minimize" and its variants does not necessarily refer to the absolute minimum to which a repro can be possibly reduced, but to a desired simplification level, e.g., a "min-repro" is a simplified version of an original repro.

In FIG. 1, an original repro 102 is parsed by a parser 104 into a parse tree 106 in a known manner. Using language grammar, a minimizing mechanism 108, including a minimize algorithm 110, produces the min-repro 112. As part of determining the min-repro, the minimizing mechanism 108 may execute simplified repros on an appropriate database engine 114, e.g., to test whether a bug manifests for a given simplified repro.

The following is an example of a repro which uses the MDX language (SQL is generally more well-known):

---

WITH SET mySet0 =
    { [Employee].[Employee Department].[Department Name].
        & [Purchasing].&[Purchasing Manager].&[279] :
    [Employee].[Employee Department].[Department Name].
        & [Production].&[Production Technician].&[123] }

```
        AS SetAlias
    SET mySet1 AS DrilldownMember (
        NameToSet ( '[SalesTerritory].[SalesTerritory].
                        [Group].&[North America]' ),
        NameToSet ( '[SalesTerritory].[SalesTerritory].
                        [Group].&[Europe]' )
                )
    SET mySet2 AS [Customer].[Customer Geography].[Country].
                    &[Germany].Children
    MEMBER [Measures].[C0] AS my Set2.Count
    MEMBER [Measures].[C1] AS mySet0.Count
    MEMBER [Measures].[C2] AS mySet1.Count
SELECT mySet1 ON 0,
    { [Product].[Product Model Lines].[Model].
                    &[Front Derailleur] :
      [Product].[Product Model Lines].[Model].
                    &[Road-350-W] } ON 1
FROM (
  SELECT {
    ([SalesTerritory].[SalesTerritory].[Group].&[Europe] )
  } ON 0
  FROM [Adventure Works]
)
WHERE { [Measures].[Internet Order Count] }
```

Note that a repro is not restricted to single queries, but generally comprises a full workload. A minimization problem is associated with a testing function T: repro→{✓, ×, ⓢ, ?}, which determines whether the bug manifests for a given repro. The semantics of the testing function T are as follows. $T(r)=×$ means that the repro r fails the test (and therefore the bug is reproduced for r). $T(r)=✓$ means that the repro r passes the test (and therefore does not reproduce the bug). The other two cases are used when some condition prevents getting a definite pass or fail result for a given repro. More particularly, $T(R)=ⓢ$ means that r is a syntactically valid repro but fails some semantic check (e.g., type checking), and $T(r)=?$ denotes any other unexpected condition. Note that other known approaches do not differentiate between ⓢ and ? values, however as described herein, this distinction enables a more focused search strategy.

In any repro-minimization problem there is the notion of simplifications. Formally, a simplification is a function S : repro→repro, which transforms one repro into another that is "simpler". While in general there are different variations of what constitutes a simpler repro, described herein are simplifications of the type that return a subset of characters of the input repro. Note that the result of a simplification does not necessarily have to be syntactically correct.

Consider a function C that measures the complexity of a repro (one natural definition of C is the length of the repro). Using the above notation, the repro minimization problem may be defined as follows. Consider an initial repro r and a testing function T such that $T(r)=×$. Let R be the closure of r under simplifications. A min-repro for r is any $r^* \in R$ such that $T(r^*)=×$ and $C(r^*)$ is minimal.

One aspect to minimization assumes monotonicity of test results. In general, if a repro r passes while searching for minimal repros, then no simpler version of r can fail again, (that is, if $T(r)=X$, then $T(S(r))\neq×$ for any simplification S). Another aspect is to relax the notion of minimality into 1-minimality. More particularly, a repro r* is 1-minimal with respect to a set of simplifications S, if $T(r)=×$ and $T(S(r))\neq×$ for each $S \in S$. This corresponds to a local minimum (with respect to a family of simplifications), where the repro fails (×) but any single simplification does not fail anymore.

The testing function T(r) may be defined as follows. Given an input repro r, an attempt is made to execute r in the server (engine 114). If r executes normally, $T(r)=✓$. If the server crashes while executing r, $T(r)=×$. The other two possible outputs of T are that T cannot execute r due to a semantic error, whereby $T(r)=ⓢ$. Any other unexpected condition results in $T(r)=?$. This can be used for problems that result in server crashes.

One additional scenario comprises wrong results. Consider a new build of a database system provides different results from those of a previous release for a given repro. In this case, the testing function attempts to execute the input repro in both systems, collects the results, and returns ✓ if both result sets agree or × if they disagree. The conditions for ⓢ and ? are the same as before.

Another scenario is when a database optimizer changes. Consider two releases of a database system that return different execution plans for a given query. The testing function tries to optimize the input repro r using both optimizers, and returns ✓ or × depending on whether the respective execution plans are the same or not. A weaker alternative that is useful returns × only if the resulting plans differ by more than some percentage (e.g., ten percent).

Specific engine features provide another scenario. Consider trying to determine the simplest repro that exercises a given optimization rule in the server, or uses a specific physical operator. In this situation, the testing function needs to be defined specifically for each scenario, by programmatically identifying when the given condition is satisfied.

Turning to minimizing database repros based on language grammars, consider the following grammar, where lowercase tokens and symbols are terminals nodes (FIG. 2):

$$L \to LvL | L \land L | (L) | C \quad C \to id=number$$

Figure 3:
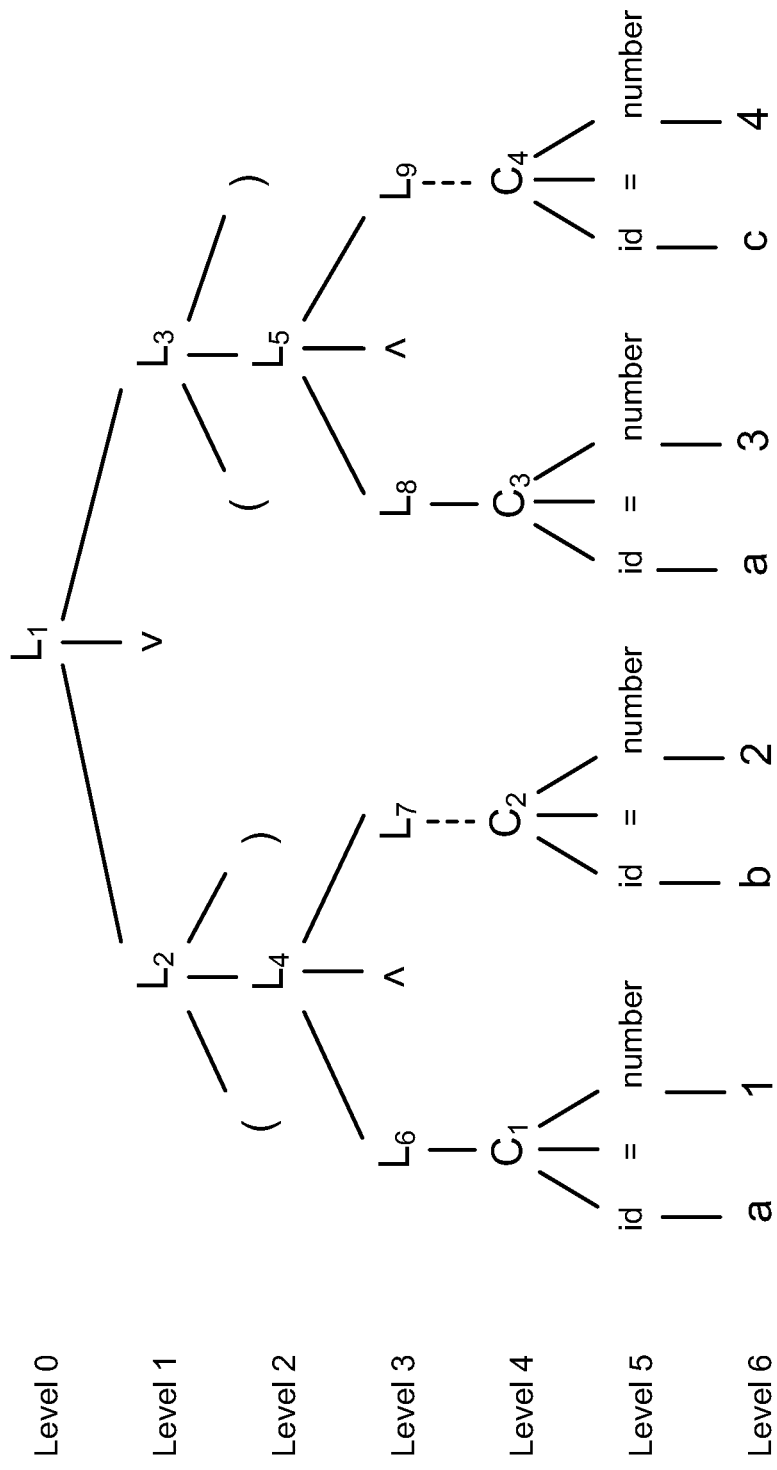

Suppose that an expression evaluation engine cannot handle the same variable appearing multiple times in an expression. The engine therefore fails with predicate "(a=1 ∧ b=2) V (a=3 ∧ c=4)" (as generally represented in FIG. 3) because a is used twice. The simplest repro for this problem is "a=1 V a=3".

The well-known technique of using delta-debugging to minimize the original repro produces many malformed inputs, and can only return the original input as the min-repro. Hierarchical delta-debugging (HDD), which takes structure into account up to an extent, proceeds one level at a time, using traditional delta-debugging at each level. However, due to the specific family of simplifications that both the traditional delta-debugging technique and its hierarchical version consider, many potentially interesting repros are not even explored with hierarchical delta-debugging. The simplifications considered by these algorithms are designed in this way because exploring every subset of tokens of the input repro is too costly. Thus, delta-debugging restricts the search space heuristically.

Figure 5:
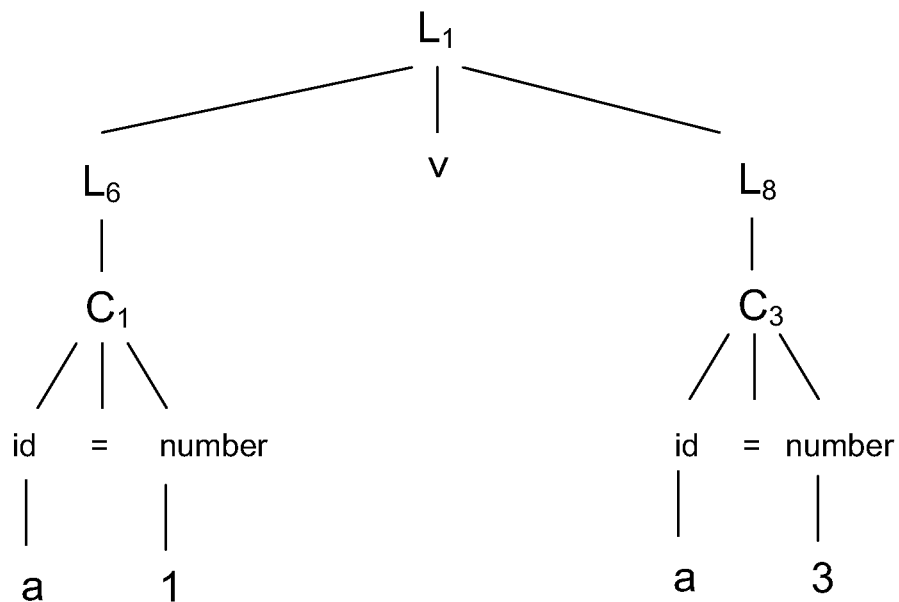
Figure 4:
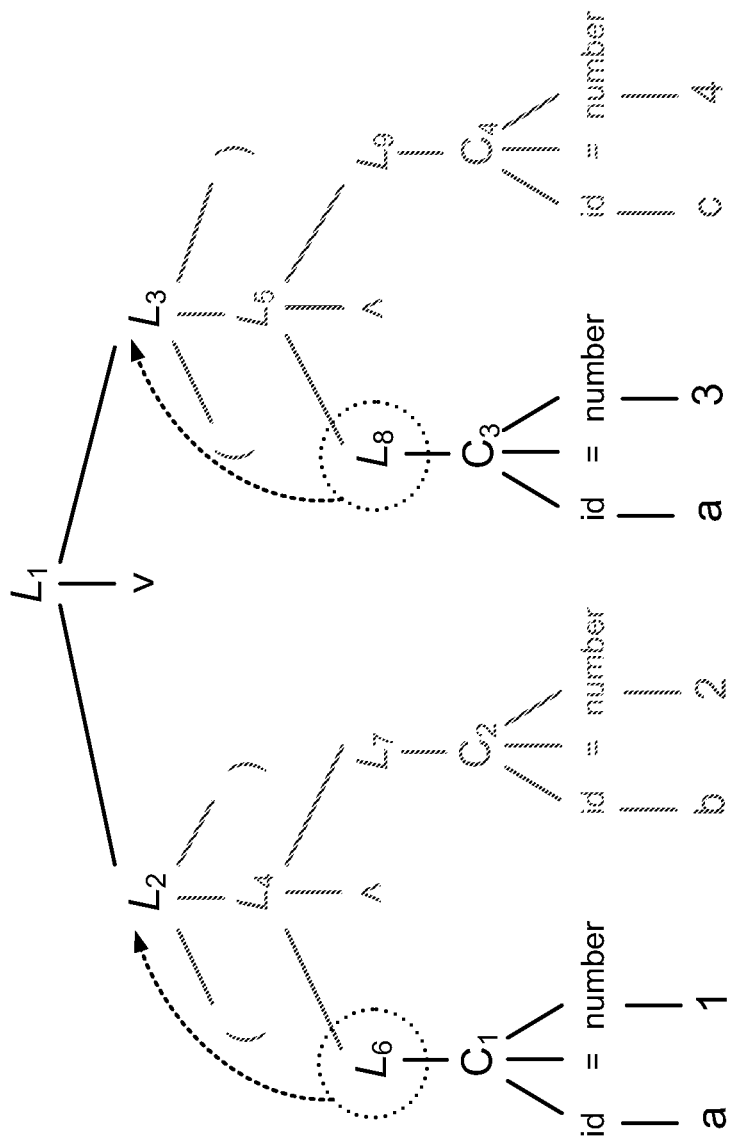

Described herein is leveraging the grammar that produced the input repro, (in a more systematic manner than HDD), by exploiting the knowledge of grammar rules themselves. More particularly, consider FIGS. 3-5, in which via grammar rules, the repro-minimization mechanism replaces one subtree rooted at L in level 1 in FIG. 2 with another one rooted with the same label; note that a syntactically correct predicate is produced. For example, by replacing $L_2$ with $L_6$, and replacing $L_3$ with $L_8$, (the replacement operations are represented in FIG. 4 by the dashed circles and arrows) the desired min-repro is obtained (FIG. 5).

Described herein is using the grammar and its encoded information to perform a more focused set of simplifications. Consider any internal node n in the repro's parse tree (e.g., let n be the root of the tree in FIG. 3). Given n, the production rules in the grammar that originate from n's label may be identified. In this example, these are L→LVL, L→L∧L, L→(L), and L→C. Consider one of such rules, such as $g=L\rightarrow L \wedge L$. The process identifies any three subtrees $\{n_1, n_2, n_3\}$ of n such that the root of $n_i$ is the same as the i-th token in the right-hand-side of g, and the common ancestor of any subset of $\{n_i\}$ does not belong to any $n_i$ (i.e., all $n_i$ are disjoint). Then, n's children may be replaced with $n_i$, obtaining a syntactically valid repro.

Formally, the simplifications that are considered for an input repro r are pairs (n,D), where n is a node in r's parse tree, and $D=[n_i]$ is a k-tuple of nodes in the subtree rooted at n (i.e., k descendants of n). Applying a simplification (n,D) to a parse tree is done by replacing all children of n by nodes in D (note that the original number of children in n and |D| need not be the same).

The set of simplifications for a repro r are:

$$S_r = \bigcup_{\substack{n \in parseTree(r), \\ g \in grammarRules(n)}} S_n^g$$

where parseTree(r) corresponds to the parse tree of the input repro r, grammarRules(n) returns the set of production rules in the language grammar that have n's label in the left-hand side, and $S_n^g$ are the simplifications for n and grammar rule g.

For a node n with label $T_n$ and grammar rule $g=T_n\rightarrow T_{n1} T_{n2} \ldots T_{nk}$, define:

$$S_n^g = \{(n, D): D \in \times_i candidates(n, T_{n_i}) \wedge valid(n, D)\}$$

In other words, the combinations of subtrees among the candidates for each token in the grammar rule are generated, and the valid ones kept. The set of candidates for a node n and token $T_{n_i}$ is defined as the set of nodes $\{n_i\}$ in the subtree of n that have $T_{n_i}$ as their labels. Because each candidate set is obtained independently from the others, there will be combinations that are invalid. More specifically, valid(n,D) discards combinations that exactly contain all children of n (that is, D=children(n)), or there exists $d_1$ and $d_2$ in D such that $d_1$ is a descendant of $d_2$.

Figure 2:
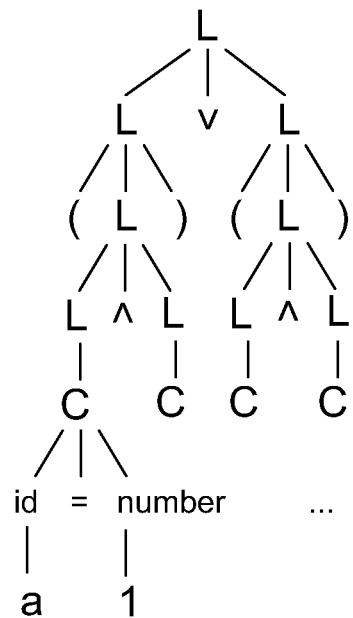
FIGS. 2-5 are representations of example parse trees corresponding to repros, including representations of simplifying a parse tree (FIG. 3) into a simplified parse tree (FIG. 5) by replacing higher-level nodes with lower level nodes (FIG. 4) according to grammar rules.

By way of example, consider an additional rule $L \rightarrow L \wedge C$ in the grammar of FIG. 2. Then, candidates$(L_4, C)=\{C_1, C2\}$ and candidates$(L_2, L)=\{L_4, L_6, L_7\}$. A simplification of the form $(L_4, \{L_6, \wedge C_1\})$ is not valid because $C_1$ is a descendant of $L_6$.

To speed up the processing of results, numbering schemes originated in the context of XML query processing may be used, e.g., by associating each node n in the parse tree with a pair of numbers (l, r), which correspond to a pre-order (respectively post-order) traversal of the tree. Using this scheme, ancestor l descendant relationships (and thus the Validity of a simplification as discussed above) can be checked in constant time, since $n_1$ is an ancestor of $n_2$ if and only if $l_1 < l_2$ and $r_1 > r_2$.

The following table comprises a high-level description of a minimization algorithm, minimizeGen, that exhaustively traverses the search space of simplifications and obtains the globally optimal min-repro:

```
minimizeGen (P:parse tree, in/out minP:parse tree)
01    for each simplification S=(n, D) of P
02        simpP = simplify(P, S) //replace n's children with D
03        if simpP is cached, continue (go back to 1)
04        T_simpP = τ( treeToString(simpP) ) // cache result
05        if (T_simpP ≠ ✓)
06            if (T_simpP=× and "simpP < minP")
07                minP = simpP
08            minimizeGen(simpP, minP)
```

The algorithm takes a parse tree representation P of the original repro as the input, and maintains and returns the min-repro minP (initially minP=P when calling minimizeGen, since by definition P fails). Conceptually, minimizeGen is a depth-first traversal of the set of repros obtained by using simplifications. The main algorithm iterates in lines 1-8 over each possible simplification S of P. For each such simplification S=(n,D) line 2 obtains the simplified parse tree simpP by replacing children of n by D as described above. If the resulting parse tree simpP has been seen before (note that multiple sequences of simplifications can result in the same parse tree), line 3 skips the simplification by using a global cache. Otherwise, simpP is processed to obtain the corresponding string, which is passed to the testing function in line 4 to obtain one of the possible answers $\{✓, ×, Ⓢ, ?\}$. Due to monotonicity, every time that $T_{simpP}=✓$ (passes, i.e., the simplified repro does not fail) in line 4, no repro further simplified from simpP will fail, and thus the search is pruned. If, instead, the testing function returns × and simpP is the smallest repro thus far, it is saved via lines 6-7. In general, if the testing function does not pass (i.e., $T_{simpP}\neq✓$), line 8 recursively calls minimizeGen with the simplified parse tree simpP. After all simplifications have been (recursively) processed, the algorithm returns the overall min-repro in minP.

It can be shown that obtaining the globally optimal min-repro requires in the worst case evaluating a number of repros that is exponential in the original repro size. Consider the simple grammar:

List→Number|List, Number which generates lists of numbers separated by commas. Also, consider a failing input repro with k numbers (which corresponds to a parse tree of 3k-1 nodes). A simplified repro corresponding to any non-empty subset of these k numbers can be generated from the original one using a sequence of simplifications. Thus, there are $2^k-2$ distinct repros (not counting the input one). Now consider any algorithm that attempts to minimize the input repro, and define the testing function in such a way that returns "?" for the first 2k-3 distinct repros that the algorithm evaluates (whichever they are except for the original failing one), and × for the remaining one. Then, any algorithm has to evaluate $2^k-2$ repros to get the correct answer for an input of size 3k-1.

Two properties may be used to significantly improve the performance of minimizeGen without compromising the quality of results, namely redefining simplification candidates and pruning semantic errors Consider node $L_1$ in FIG. 2 and rule $g=L\rightarrow LVL$. In this case, candidates(L1, L)=$\{L2, \ldots, L8\}$. Suppose that $L_1$ is transformed by replacing $L_2$ by $L_6$ and $L_3$ by any node in $\{L_3, L_5, L_7, L_8, L_9\}$. Although the simplification is valid, there is a different simplification path that results in the same repro. More particularly, the process can first replace $L_2$ by $L_4$ and $L_3$ by the same element as above. Then, candidates$(L_4, L)$ include $L_6$, obtaining the same repro using an additional simplification. In general, generating the same repro multiple times results in performance degradation. This situation arises because of including in candidates(n, T) every node in the subtree of n with label T. Since simplifications are applied in sequence, the concept of candidates may be refined to eliminate this specific class of duplicate simplification paths (note that detecting every possible duplicate simplification path is, in general, non-computable). The set of candidates for a node n and token $T_{n_i}$ is redefined as the set of nodes $\{n_i\}$ in the subtree of n that have $T_{n_i}$ as their labels, and for which the only node (if any) in the path from n to $n_i$ that has $T_{n_i}$ as its label is a direct child of n. That is, the candidate set of n and $T_{n_i}$ is the set of $T_{n_i}$-labeled nodes in the subtree of n that have no $T_{n_i}$-labeled ancestors other than n itself or its direct children. In this way, if a descendant $n_i$ of n has an ancestor (other than a direct child of n) sharing the same token, $n_i$ is explored later, and thus it can be removed from the current candidate set in line 1.

With respect to pruning semantic errors, in traditional and hierarchical delta-debugging algorithms (which do not differentiate between semantic check failures Ⓢ and unknown failures "?"), most of the unknown ("?") outcomes result from syntactic errors. A much smaller proportion of unknown ("?") outcomes result from semantic errors, e.g., cases in which the input string parses correctly, but there is a type error or some other post-parsing check fails. The (relatively insignificant) remaining fraction of unknown ("?") outcomes covers all other unexpected situations, such as hitting other bugs, or problem-specific conditions for which a repro cannot be evaluated.

Line 5 in the above algorithm correctly prunes all simplifications from a passing repro (i.e., T(simpP)=✓) due to monotonicity. Under certain assumptions, the search also may be pruned based on semantic errors, if T(simpP)=Ⓢ.1 Note that by definition of the simplifications, all resulting repros are syntactically correct. Because the process replaces right-hand-sides of production rules with valid alternatives, the parser accepts any simplified string. This property already eliminates the largest source of unknown outputs "?" in delta-debugging, thus focusing on repros that are actionable; (note that this does not mean that every repro produced by the technique results in either × or ✓); although parsing errors are ruled out, some repros result in semantic errors because the simplifications only take into account grammar rules.

By way of another example, consider the following SQL-based repro:

SELECT * FROM R, S WHERE R.x=S.y AND S.b=5

Suppose that the grammar rules for the list of tables in the FROM clause are as follows (the actual SQL grammar is more complex, but is simplified for purposes of explanation):

tableList→tableList, tableName|tableName

Simplifying the top-most tableList in the parse tree returns simpP:

SELECT *FROM S WHERE R.x=S.y AND S.b=5

As can be readily appreciated, T(simpP)=Ⓢ due to the "dangling" column R.x.

Although errors from invalid inputs are still possible when using the techniques described herein, there is a significant difference compared to the analogous case in delta-debugging. More particularly, if the module that performs semantic checking satisfies the reachable property defined below, repros that return semantic error Ⓢ can be pruned out without compromising the search strategy.

To this end, a semantic checker is reachable if, for any sequence of simplifications, $R_1 \rightarrow R_2 \rightarrow \ldots \rightarrow R_n$ such that $T(R_i) \in \{✓, ×, Ⓢ\}$ there is another sequence of simplifications $R_1 \rightarrow R'_2 \rightarrow \ldots R'_k \rightarrow R_n$ such that $T(R_i) \in \{✓, ×\}$. If a semantic checker is reachable, there is no need in further minimizing a repro R that returns Ⓢ, since there will be an alternative derivation path reaching anything useful that can be obtained from R. Therefore, line 5 in the minimizeGen algorithm may be replaced by:

05 if ($T_{simpP} \neq$ ✓ and $T_{simpP} \neq$ Ⓢ)

Continuing with the example, the simplified repro simpP can be further simplified into a semantically valid repro by eliminating the predicate R.x=S.y, thus resulting in simpP2:

SELECT * FROM S WHERE S.b=5

Note that the same derivation may be obtained by first eliminating the join predicate from the original repro:

SELECT * FROM R, S WHERE S.b=5 and then removing table R, obtaining the final repro simpP2 without passing through any Ⓢ values.

To obtain a practical search algorithm, the global minimality condition may be relaxed to 1-minimality. In other words, rather than finding the global min-repro, a locally minimum one (i.e., one for which every simplification does not fail) may be found. Note that even though both delta-debugging and the approach described herein return 1-minimal solutions, the definition of 1-minimality depends on the family of simplifications. For that reason, the min-repros obtained with the technique described herein are simpler than those found using alternatives.

The following table shows "minimize," an algorithm to find 1-minimal repros:

```
minimize (P:parse tree //(note that T_P = ×),
                in/out LM:integer,
                in/out minP:parse tree)
01    isLM = true
02    for each simplification S=(N,D) of R
03       if (LM > 0)
04          simpP = simplify (P, S)
05          if (simpP is cached) continue back to 2
06          T_simpP = τ( treeToString(simpP) ) //cache result
07          if (T_simpP = ×)
09             isLM = false
09             if ("simpP < minP") minP = simpP
10             minimize (simpP, LM, minP)
11    if (isLM) LM–
```

The general idea is to adapt the above-described minimizeGen algorithm to prune the search whenever T(simpP)≠×. Note that because Ⓢ values can be safely pruned without compromising quality due to the reachability property, the 1-minimality property only prunes (compared to minimizeGen) the considerably smaller fraction of repros that return "?". The minimize algorithm takes an additional parameter LM, which controls how greedy the resulting search strategy is. A value of LM=1 results in a purely greedy technique that explores a single local minimum. Increasing the value of LM results in the minimize algorithm exploring additional local minima. Line 11 in the minimize algorithm checks whether a local minimum is reached by verifying whether some simplification from the current repro failed (i.e., whether is LM is true). In that case, the value of LM is decreased; (line 3 stops the search once the correct number of local minima are processed). Thus, the minimize algorithm either calls itself recursively at least once in lines 2-10, or otherwise reduces the value of LM by one.

Due to the greedy approach of the minimize algorithm, the ordering of simplifications may influence the quality of results. In one implementation, the following criteria is used to rank the possible simplifications of a given parse tree P in line 2. First, P's nodes are ordered using a breadth-first search, with simplifications generated in such an order. In general, this is to start with simplifications that may make more of a difference (i.e., nodes are higher in the parse tree) before going down into smaller and more precise ones. As an intuitive SQL example, an attempt to remove a whole sub-query is tried. If this simplification' does not reproduce the problem, the process goes down the parse tree and tries simplifying the sub-query itself. Note that if after removing the whole sub-query the problem is still reproduced, considerable time is saved.

With respect to grammar rules, within a given node n (obtained in breadth-first search order), a round robin on the grammar rules of n is used. Each time that a new simplification is asked for, the process moves to the next grammar rule that has outstanding simplifications and obtains the next one. The rationale is that the process avoids getting stuck in a long sequence of simplifications of an "ineffective" grammar rule, and instead explores the space more evenly.

For candidates, for a given node and grammar rule, candidates for each token are sorted in decreasing sub-tree size (i.e., by descending (r-l) values, where l and r are given by the numbering scheme described above). All combinations are generated according to such order, which gives more priority to nodes with larger (r-l) values, covering larger portions of the parse tree.

The following is a final min-repro for the MDX repro described above:

```
WITH SET mySet1 AS DrilldownMember (₍₁₎
        NameToSet ('[SalesTerritory].[SalesTerritory].[Group].
            &[North America]')
        , NameToSet₍₁₎ ('[SalesTerritory].[SalesTerritory].[Group].
            &[Europe]') )₍₁₎
    SELECT FROM ( SELECT₍₂₎ [Europe] ON 0₍₃₎
        FROM [Adventure Works] )
```

The underlined (or otherwise visibly indicated) portions of the min-repro correspond to "crucial" query fragments that, if removed, produce a valid query that no longer reproduces the problem. Specifically, the problem reproduces whenever there is a nested SELECT clause (fragment (2) above), a DrilldownMember function with a parameter that uses NameToSet in a member function (fragment (1)), and a specific projection in the 0 axis (fragment (3)). Removing any of these elements from the min-repro makes the problem cease to manifest:

Thus, in this example there are certain portions of text that if removed from the min-repro, prevent the bug from manifesting. These are referred to as "breaking changes" because they are fragments that, if added to a given passing test, make the bug manifest. To find such breaking changes, in a first step, each parse tree P is associated with the list of trees simpP that were simplified from P and resulted in T(simpP)=✓. More particularly, the following lines may be added to the "minimize" algorithm:

```
10.1 else if (TsimpP = ✓)
10.2     P.simpPass += simpP
``` where simpPass is the list of passing repros associated with the current parse tree P. The result of this first step is that, after obtaining the min-repro, a (possibly long) list of all simplifications that result in a passing test is already generated.

A second step to find the breaking changes post-processes the resulting list of parse trees and returns a meaningful subset of these. The following is an example.

Suppose that an initial SQL repro is:

```
SELECT * FROM T
WHERE (a=1 AND b=2) OR (a=3 AND c=4)
``` and assume that the testing function fails whenever the same column is mentioned more than once in the query.

The min-repro is:

```
SELECT * FROM T
WHERE a=1 OR a=3
```

The list of passing cases simplified from this min-repro contains:

```
SELECT * FROM T
SELECT * FROM T WHERE a=1
SELECT * FROM T WHERE a=3
```

Either of the last two statements (in conjunction with the min-repro) is useful in understanding the possible root cause of the problem. However, the -first one is "subsumed" by the others, since it is removing a strict superset of what the others do. Note that while the previous example contains just one unwanted repro, for more complex scenarios there may be several of such superfluous alternatives.

In general, the process is interested in the set of changes that make the problem disappear, and are not "dominated" by others. A known "skyline" of the set of repros in minP.simpPass is obtained, for the following dominance function:

P1<P2≡treeToString(P2) is subsequence of treeToString(P1)

In the previous example, this definition successfully removes the unwanted entries.

The minimize algorithm greedily finds 1-minimal repros by pruning those that do not fail (i.e., those that satisfy TsimpP≠✗ in line 7). The process may safely prune repros that satisfy TsimpP=✓ due to monotonicity and those that satisfy TsimpP=Ⓢ due to reachability. However, the minimize algorithm also prunes repros for which TsimpP=? in line 7. Therefore, even when LM=∞, minimize does not give the same results as the exhaustive "minimizeGen" algorithm described above.

Described herein is generalizing the minimize algorithm to behaves as the greedy variant when LM=1 and as the exhaustive algorithm when LM=∞. For that purpose, each parse tree P is associated with the list of trees simpP that were simplified from P and resulted in T(simpP)=? (analogous to passing repros):

```
10.3 else if (TsimpP = ?)
10.4     P.simpUnknown += simpP
```

The algorithm is recursively called whenever the simplified repro satisfies $T_{simpP} \in \{\times, ?\}$. Specifically, the recursion is with the failing cases (✗) first, and then with the unknown cases "?". The rationale is that chances are higher to reach a local minimum if following failures (✗) first, as "?" cases are really unknown and subsequent simplifications may either pass or fail; (note that while the ordering is irrelevant for an exhaustive enumeration, it makes sense for smaller values of LM). To implement this behavior, the following lines are added to the minimize algorithm:

```
12  for each PSU in P.simpUnknown
13      if (LM > 0)
14          minimize(PSU, LM, minP)
```

These modifications expand the search space of minimize to consider additional simplifications from repros that are 1-minimal (and therefore not explored by the minimize algorithm). While the complexity of the resulting algorithm is the same as that of minimize when LM=1, the worst case scenario even for LM=2 is exponential.

To summarize, the result of minimizing a repro R is a pair (R*,B) such that:

1. $T(R^*) = \times$ (R* fails).
2. $T(S(R^*)) \neq \times$ for any simplification S(R* is 1-minimal).
3. $B=\{B_1,...,B_n\}$ such that $T(B_i) = $, $B_i = S_i(R^*)$ for some simplification $S_i$, and $B_i \not< Bj$ for each Bi, Bj.

Turning to another aspect, for a given domain (e.g., SQL) there may be additional, domain-specific optimizations that further improve the performance of the above-described techniques. For example, specialized simplification rules may be used, such as for scenarios that can benefit from preventing certain simplifications from being applied, or conversely from applying simplifications not covered by the grammar-based approach. To illustrate preventing simplifications, consider the following MDX query:

SELECT [Date].[Calendar].[CalendarYear].[CY2001] ON 0
FROM [Company Works]
WHERE [Measures].[InternetStandardProductCost]

The MDX grammar allows further simplifying this query by eliminating dimensions. A valid simplified query is shown below:

SELECT [CY2001] ON 0 FROM [Company Works]
WHERE [InternetStandardProductCost]

Due to certain features, both queries are actually equivalent in one implementation of an analysis services engine. The reason is that the engine infers missing dimensions in hierarchies and therefore implicitly reintroduces them while evaluating the query. However, developers trying to understand a problem prefer the former query (with all the dimensions explicitly included) even though it is "larger" than the smallest possible repro. Otherwise, they would have to (manually) examine the cube and perform the inference of hierarchy dimensions.

Handling this scenario may be accomplished by disabling production rules in the grammar that perform such simplifications (e.g., rules such as "formula→formula identifier" are not used for simplifications in line 2 of the minimize algorithm. This general notion can be extended to be context sensitive, and thus a given production rule can have a complex condition that enables it to produce a simplification.

To illustrate using additional simplifications beyond the grammar-base approach, consider replacing the SELECT clause of a SQL query with the star symbol *. Because there are no * symbols in the subtree of a SELECT clause that does not already use *, there will not be any valid simplification that produces such a change. However, in some scenarios this is valid (e.g., when there are no GROUP BY clauses in the query), so such a simplification rule may be added to the set of alternatives. This can be generalized to having default values for terminal nodes in the grammar (e.g., the value 0 for a number, or the string "foo" for a string identifier), and using such values in cases that there is no match for a given grammar rule. Using such extended rules can also help eliminate some results (e.g., if the type system of the language is known, some subtree with a canonical constant value may be replaced with the correct type).

The more information known about the repro domain (or even the specific bug for which a min-repro is being sought), the more likely the search may be biased towards better-quality repros. Consider, as an example, SQL as the underlying language, and suppose that the testing function actually executes the repro (i.e., it does not just optimize it). Removing predicates in SQL queries may result in very long running queries. In this case, it may be beneficial to rank first those simplifications that result in cheaper execution plans.

A second search variant is related to the global search procedure. As described above, the overall search follows a depth-first search approach, that is, after exhausting the simplifications for a given node, the process backtracks to its parent node and continues with the next simplification. Alternatively, a different strategy may be used, by redefining the point to which the process backtracks after exhausting a given node. Using destinations that are closer to the root generally increases the time to find a new local minimum, but at the same time results in more variety in the set of local minima.

Another variant results from knowledge of the grammar itself. Certain parser generators (e.g., ANTLR5) allow writing production rules using regular expressions. For instance, rather than writing production rules like:

groupByCols→column|column, groupByCols a more compact style may be used (note that parentheses and star symbols are meta-elements like "|" in the example above):

groupByCols→column (, column)*

A best-effort approach may be attempted to detect these patterns in the grammar itself, and use them for specialized simplifications. As an example, consider the production rule above, which essentially specifies that a group-by clause contains a set of one or more columns separated by commas. Rather than generating all valid combinations, groupByCols may be simplified by gathering all descendant column nodes in the subtree, by and using the traditional delta-debugging algorithm on this set of columns (fixing the appropriate set of commas for each case produced by delta-debugging). This specialized usage of delta-debugging always returns syntactically valid repros, because it is driven by knowledge of the grammar rules. This can also be applied in other situations, such as for long scripts that contain multiple statements. For such cases, using traditional delta-debugging at the level of whole statements, and the technique described herein within each statement, can leverage the benefits of each approach at an appropriate place.

Another aspect is directed to significantly reducing the number of repros with semantic errors (i.e., those with $T(R)=Ⓢ$). The general idea is to exploit domain-specific information about the semantic checker and directly "fix" a repro that would otherwise result in Ⓢ. By way of simple example, consider a simplification rule that eliminates a table in the FROM clause of a given SQL query. It is likely that columns in the removed table are mentioned in the SELECT, WHERE, GROUP BY, ORDER BY, and HAVING clauses in the query, and therefore the simplified repro is invalid. If the semantics of SQL are understood, the resulting repro may be fixed by identifying the smallest subtree that contains each mention of a column of the removed table, which be removed without generating a syntactically incorrect repro. After such subtrees have been removed (the mechanisms for removing such subtrees are essentially the same ones as for applying simplifications), the process checks whether the removals resulted in another semantic problem, in which case the remaining problems may be recursively fixed.

Consider as an example the repro below:

```
SELECT R.a, SUM(S.b)
FROM R, S
WHERE R.x=S.y and S.b<10
GROUP BY R.a
``` and suppose that a simplification removes table R. In this case, the mentions of columns in R in the query are located, and the smallest subtrees that contain them eliminated. For R.a in the SELECT clause, the column is eliminated. For R.x in the WHERE clause, the whole join predicate is eliminated. For R.a in the GROUP BY clause, the GROUP BY clause needs to be eliminated in addition to the column, because there cannot be a. GROUP BY clause without columns. The result is the following syntactically valid repro:

```
SELECT SUM(S.b)
FROM S
WHERE S.b<10
```

Exemplary Operating Environment

Figure 6:
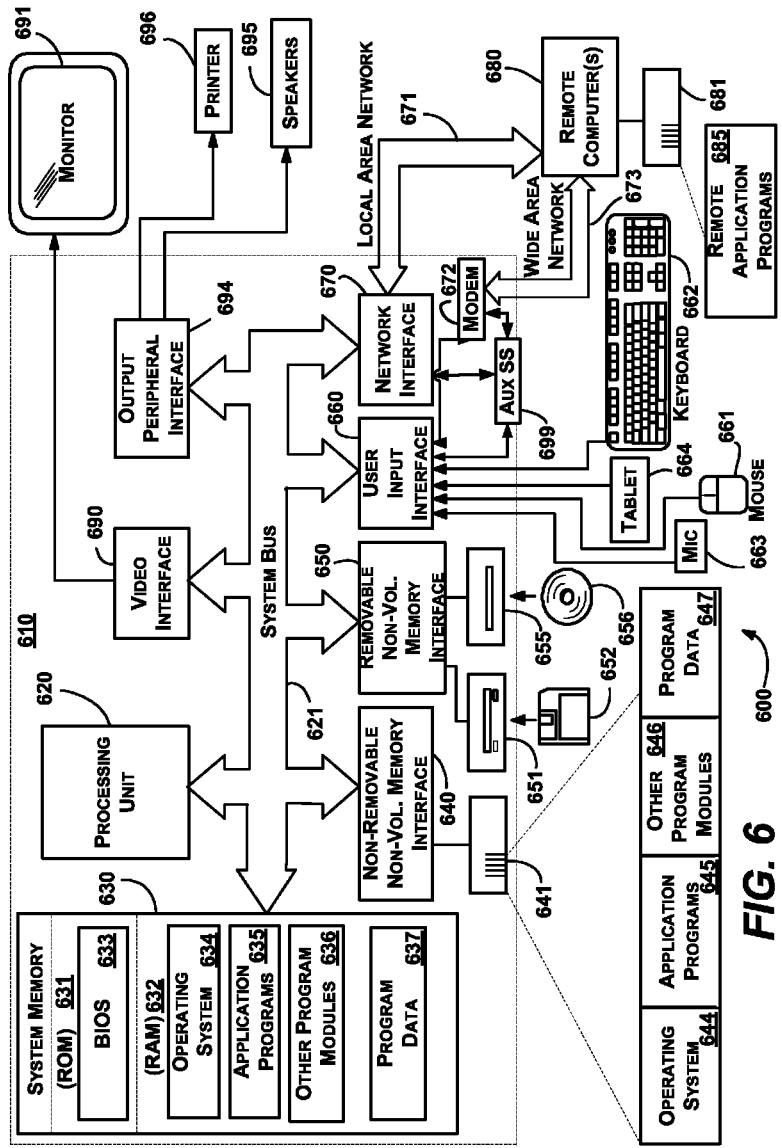
FIG. 6 shows an illustrative example of a computing environment into which various aspects of the present invention may be incorporated.

FIG. 6 illustrates an example of a suitable computing and networking environment 600 on which the examples of FIGS. 1-3 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor comprising:
    inputting a parse tree that represents an initial database repro;
    simplifying the parse tree into a simplified parse tree by replacing at least one node in the parse tree with another node based on language grammar rules;
    executing a simplified repro corresponding to the simplified parse tree to determine whether execution of the simplified repro fails because of a bug present in the initial database repro; and
    outputting a min-repro corresponding to the simplified parse tree,
    the min-repro comprising a simplified version of the initial database repro.

2. The method of claim 1 further comprising, executing a simplified repro corresponding to the simplified parse tree to determine whether execution of the simplified repro fails because of a bug present in the initial database repro, and if so, further simplifying the simplified parse tree into a further simplified parse tree.

3. The method of claim 1 further comprising, executing a simplified repro corresponding to the simplified parse tree to determine whether execution of the simplified repro fails because of a bug present in the initial database repro, and if not, and simplifying the parse tree into a different simplified parse tree by replacing at least one other node in the parse tree with a node based on language grammar rules.

4. The method of claim 1 further comprising, executing a simplified repro corresponding to the simplified parse tree to determine whether execution of the simplified repro fails because of a semantic error, and if so, pruning a portion of the search space tree that corresponds to descendants of the simplified parse tree.

5. The method of claim 1 wherein simplifying the parse tree comprises selecting a node to replace instead of another node based upon the node to replace being closer to the parse tree's root node.

6. The method of claim 1 wherein simplifying the parse tree comprises determining combinations of subtrees among candidates for a token in the grammar rule.

7. The method of claim 6 further comprising discarding invalid combinations of the subtrees.

8. The method of claim 1 further comprising, detecting one or more breaking changes, each breaking change comprising a fragment of the initial database repro that results in execution failure when included in the min-repro and does not result in execution failure when removed from the min-repro.

9. The method of claim 8 wherein outputting the min-repro comprises outputting text representing the min-repro including a visible indication of where each breaking change is present in the text of the min-repro.

10. In a computing environment, a method performed on at least one processor comprising: (a) inputting a parse tree that represents an initial database repro as a current parse tree; (b) determining simplifications for the current parse tree, the simplifications corresponding to simplified parse trees obtained by replacing nodes with descendant nodes based on language grammar rules; (c) selecting a simplification, the simplification corresponding to a simplified parse tree that has not had a simplified repro corresponding to the simplified parse tree executed; (d) executing the simplified repro corresponding to the selected simplification; (e) determining whether the execution failed, and if not, returning to step (b), and if so, determining whether the simplified parse tree corresponding to the simplification is simpler than a current minimum simplified parse tree, and if not, returning to step (b), and if so, setting the current minimum simplified parse tree to be the simplified parse tree, and performing at least one recursion by setting the current parse tree to be the simplified parse tree and returning to step (b).

11. The method of claim 10 wherein determining whether the execution failed comprises distinguishing whether the execution failed because of a bug present in the current database repro or for another reason, and if for another reason, considering the execution as having not failed and returning to step (b).

12. The method of claim 11 wherein the other reason corresponds to a failure caused by a semantic check, and further comprising, pruning part of a search space corresponding to descendants of a simplified parse tree with the semantic check.

13. The method of claim 10 wherein selecting the simplification that corresponds to a simplified parse tree that has not had a simplified repro corresponding to the simplified parse tree executed comprises, evaluating a cache that contains data identifying any simplified parse tree that has had a corresponding repro already executed.

14. The method of claim 10 further comprising, when recursion has been performed at least once, before performing another recursion, determining whether a search has reached a predetermined local minimum, and only performing the other recursion if not.

15. The method of claim 10 wherein determining whether the execution failed comprises distinguishing whether the execution failed because of a bug present in the current database repro or for an unknown reason, and wherein performing the recursion comprises, performing a first set of at least one recursion for any execution that failed because of a bug present in the current database repro, before performing a second set of at least one recursion that failed for an unknown reason.

16. The method of claim 10 further comprising, detecting one or more breaking changes, each breaking change comprising a fragment of the initial database repro that results in execution failure when included in the min-repro and does not result in execution failure when removed from the min-repro.

17. The method of claim 16 wherein outputting the min-repro comprises outputting text representing the min-repro including a visible indication of where each breaking change is present in the text of the min-repro.

18. One or more computer-readable storage media having computer-executable instructions, which when executed perform steps, comprising,
  processing an initial database repro comprising text into a min-repro comprising a subset of the text,
  including simplifying a parse tree representative of the initial database repro into a plurality of simplified parse trees based on language grammar rules,
  executing simplified repros corresponding to the simplified parse trees to determine which simplified repros fail execution because of a bug corresponding to the initial database repro, and
  from the simplified parse trees that correspond to the failed repros,
  determining a minimum simplified parse tree with respect to a desired level of minimality, and
  outputting the min-repro based upon that minimum simplified parse tree.

19. The one or more computer-readable storage media of claim 18 having further computer-executable instructions comprising, detecting one or more breaking changes, each breaking change comprising a fragment of the initial database repro that results in execution failure when included in the min-repro and does not result in execution failure when removed from the min-repro, and including in the text of the min-repro a visible indication of where each breaking change is present.

20. The one or more computer-readable storage media of claim 18 having further computer-executable instructions comprising, based upon a particular domain: preventing a simplification, using an additional simplification, ranking simplifications based upon resultant execution plans, determining a next node from which to continue processing, combining the simplifying of parse trees with another debugging operation to determine the min-repro, or altering a simplified repro to pass a semantic check, or any combination of preventing a simplification, using an additional simplification, ranking simplifications based upon resultant execution plans, determining a next node from which to continue processing, combining the simplifying of parse trees with another debugging operation to determine the min-repro, or altering a simplified repro to pass a semantic check.

* * * * *